US009924765B1

(12) United States Patent
Coronel

(10) Patent No.: US 9,924,765 B1
(45) Date of Patent: Mar. 27, 2018

(54) RAIL FASTENER

(71) Applicant: YKK Corporation of America, Marietta, GA (US)

(72) Inventor: Wolfgang E. Coronel, Macon, GA (US)

(73) Assignee: YKK Corporation of America, Marietta, GA (US)

( * ) Notice: Subject to any disclaimer, the term of this patent is extended or adjusted under 35 U.S.C. 154(b) by 0 days.

(21) Appl. No.: 15/274,081

(22) Filed: Sep. 23, 2016

(51) Int. Cl.
*A44B 18/00* (2006.01)
*B60J 7/10* (2006.01)

(52) U.S. Cl.
CPC ...... *A44B 18/0069* (2013.01); *A44B 18/0049* (2013.01); *A44B 18/0061* (2013.01); *B60J 7/104* (2013.01)

(58) Field of Classification Search
CPC ............. Y10T 428/24017; Y10T 24/27; Y10T 24/2792; A44B 18/0015; A44B 18/0061; A44B 18/0069; B60J 7/102
USPC ........................................................ 428/100
See application file for complete search history.

(56) References Cited

U.S. PATENT DOCUMENTS

| | | | | |
|---|---|---|---|---|
| 4,991,640 A | * | 2/1991 | Verkindt | B60P 7/04 160/368.1 |
| 5,715,581 A | * | 2/1998 | Akeno | A44B 18/0061 24/442 |
| 6,258,311 B1 | * | 7/2001 | Jens | A44B 18/0049 205/164 |
| 6,678,924 B2 | | 1/2004 | Murasaki et al. | |
| 6,896,759 B2 | | 5/2005 | Fujisawa et al. | |
| 8,033,591 B2 | | 10/2011 | Schmeichel et al. | |
| 8,756,770 B2 | * | 6/2014 | Cina | A44B 18/0049 24/452 |

FOREIGN PATENT DOCUMENTS

| | | | |
|---|---|---|---|
| CA | 2045993 | * | 7/2003 |
| GB | 2397620 | * | 7/2004 |

OTHER PUBLICATIONS

YKK USA; Article entitled: "YKK PowerRail Hook & Rail System", available at <http://www.ykk-usa.com/power_rail.html>, accessed on Sep. 23, 2016, 1 pg.

* cited by examiner

*Primary Examiner* — Alexander Thomas
(74) *Attorney, Agent, or Firm* — Taylor English Duma LLP

(57) ABSTRACT

A fastening device includes a base including a top surface; a first fastening field extending from the top surface of the base and including a plurality of first fastening elements, each of the first fastening elements including a fastening feature, the fastening feature of at least some of the first fastening elements extending in a first direction; and a second fastening field extending from the top surface of the base and comprising a plurality of second fastening elements, each of the second fastening elements including a fastening feature, the fastening features of all of the second fastening elements extending in a second direction that is angled with respect to the first direction, the second fastening field divided from the first fastening field by a dividing line.

12 Claims, 14 Drawing Sheets

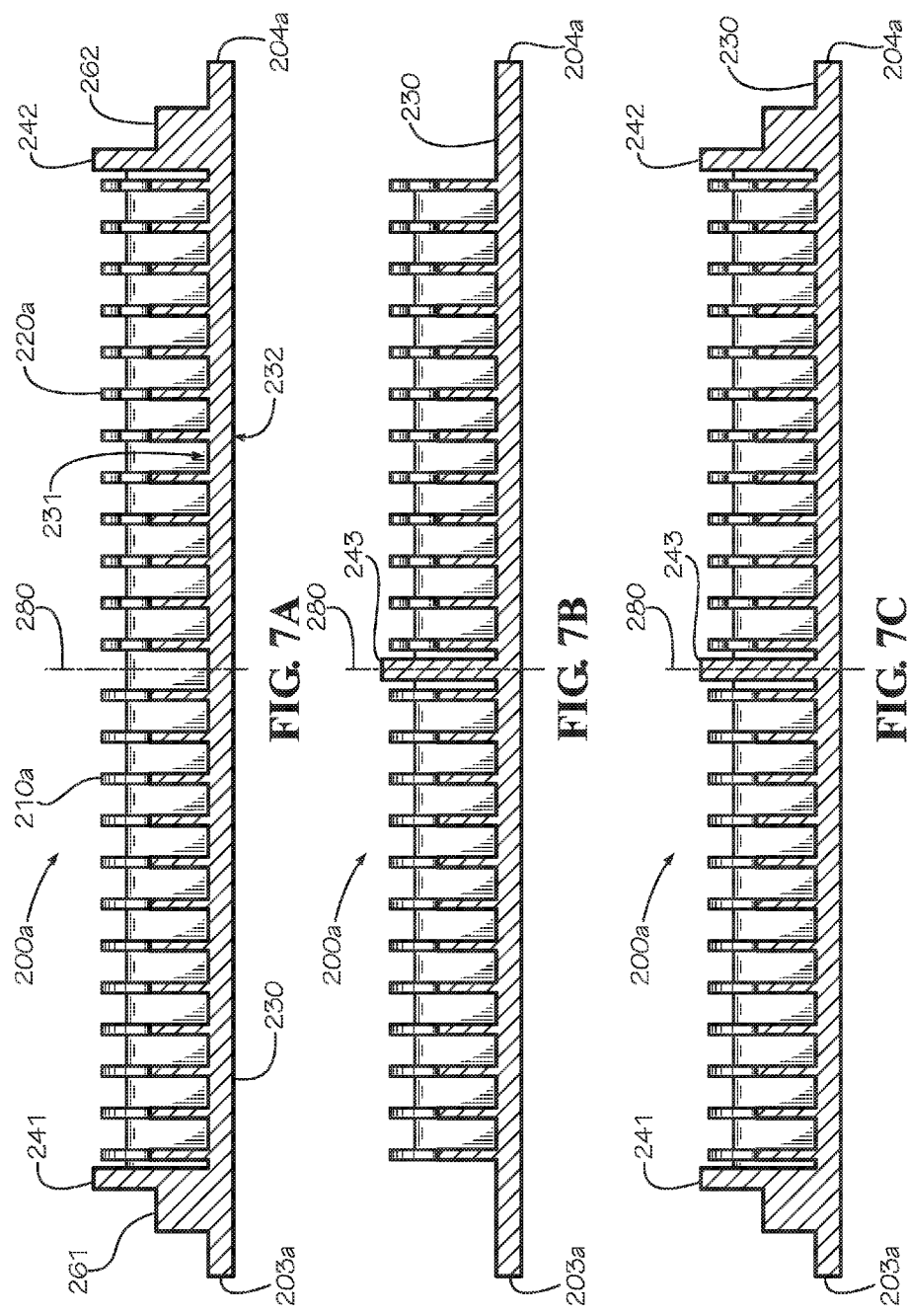

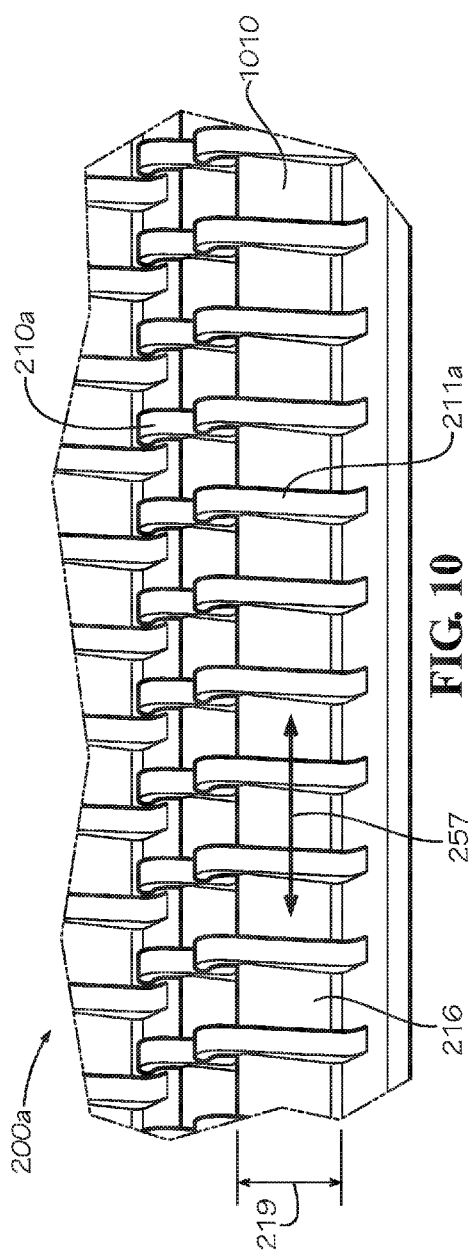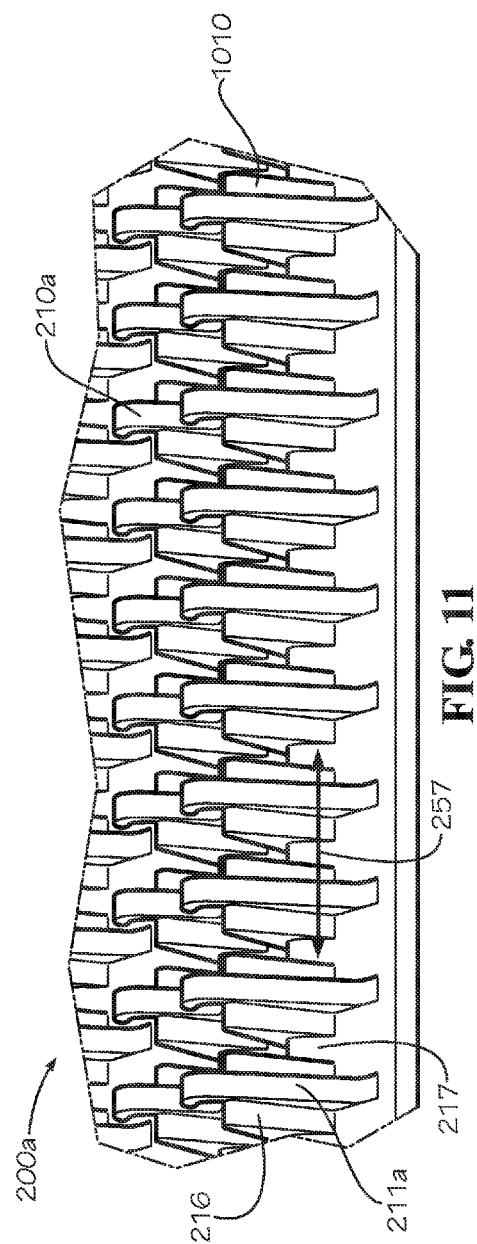

RAIL FASTENER

TECHNICAL FIELD

Field of Use

This disclosure relates to fastening devices for securing panels. More specifically, this disclosure relates to fastening devices in which at least some of a plurality of fastening features extend in the same direction.

Related Art

In a variety of situations, a panel of fabric or other material can be used to cover a portion of a vehicle or a surface of a room or to cover, shield, or partition a portion of any object. Such a panel can, for example and without limitation, be used as a tonneau cover to cover a truck bed of a pickup truck or other vehicle. Using current devices, systems, and methods, however, pulling the panel or cover tight or taut can result in premature engagement of the fastening device used to secure the panel. Such premature engagement of the fastening device by the cover can cause the fastening device to move relative to the fastening device holder in which it is installed. Such movement can cause damage to the fastening device. In addition, the fastening device can be prone to damage during loading and unloading of material due to impact loads hitting fastening elements of the fastening device or during long-term use due to one portion of the fastening device separating from another portion of the fastening device or due to deformation of a fastening device that is too flexible.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a fastening device comprising: a base comprising a top surface; a first fastening field extending from the top surface of the base and comprising a plurality of first fastening elements, each of the first fastening elements comprising a fastening feature, the fastening feature of at least some of the first fastening elements extending in a first direction; and a second fastening field extending from the top surface of the base and comprising a plurality of second fastening elements, each of the second fastening elements comprising a fastening feature, the fastening features of all of the second fastening elements extending in a second direction that is angled with respect to the first direction, the second fastening field divided from the first fastening field by a dividing line.

In a further aspect, disclosed is a fastening system comprising: a fastening device comprising: a base comprising a top surface; a first fastening field extending from the top surface of the base and comprising a plurality of first fastening elements, each of the first fastening elements comprising a fastening feature, the fastening feature of at least some of the first fastening elements extending in a first direction; and a second fastening field extending from the top surface of the base and comprising a plurality of second fastening elements, each of the second fastening elements comprising a fastening feature, the fastening feature of all of the second fastening elements extending in a second direction that is angled with respect to the first direction, the second fastening field divided from the first fastening field by a dividing line; and a panel comprising an inner surface comprising a mating fastener material, the mating fastener material configured to secure the panel to both the first fastening field and the second fastening field.

In yet another aspect, disclosed is a method of using a fastening system, the method comprising: securing a fastening device to a mounting surface, the fastening device comprising: a first fastening field comprising a plurality of first fastening elements, each of the first fastening elements comprising a fastening feature; and a second fastening field comprising a plurality of second fastening elements, each of the second fastening elements comprising a fastening feature, the second fastening field divided from the first fastening field by a dividing line; contacting the fastening device with a mating fastener material of a panel, the mating fastener material configured to secure the panel to both the first fastening field and the second fastening field; and sliding the mating fastener material with respect to the fastening device.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 7A is a sectional view of the first fastening device of FIG. 4 taken along line 7-7 of FIG. 4.

FIG. 7B is a sectional view of the first fastening device of FIG. 4 in accordance with another aspect of the current disclosure.

FIG. 7C is a sectional view of the first fastening device of FIG. 4 in accordance with another aspect of the current disclosure.

FIG. 10 is a detail perspective view of a portion of the first fastening device of FIG. 4 in accordance with another aspect of the current disclosure.

FIG. 11 is a detail perspective view of a portion of the first fastening device of FIG. 4 in accordance with another aspect of the current disclosure.

DETAILED DESCRIPTION

Figure 1:
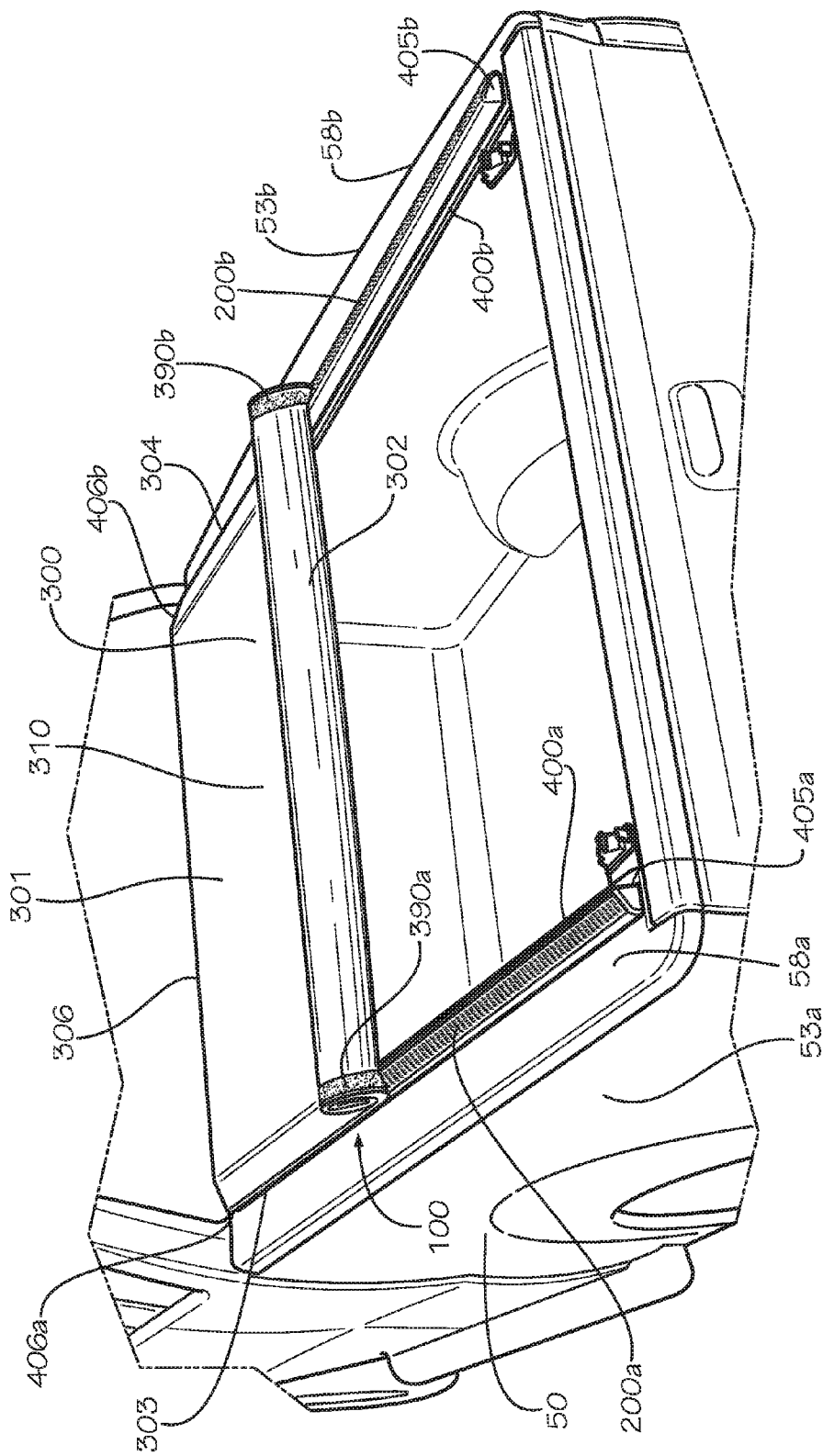
FIG. 1 is perspective view of a fastening system secured to a vehicle in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements disclosed herein, the conventions of "left," "right," "front," "rear," "upper," "lower," "inside," "outside," "inboard," "outboard," "horizontal," and/or "vertical" may be referenced. Unless stated otherwise, "rear" describes that end of the vehicle or the fastening system nearest to the tailgate or trunk or tail of the vehicle; "front" is that end of the vehicle that is opposite or distal the rear; "left" is that which is to the left of or facing left from a person positioned inside the vehicle and facing towards the front of the vehicle; and "right" is that which is to the right of or facing right from a person positioned inside the vehicle and facing towards the front of the vehicle. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, a fastening device and associated methods, systems, devices, and various apparatuses are disclosed herein. The fastening device can comprise a plurality of fastening elements. A fastening system comprising the fastening device can comprise a panel and can further comprise a fastening device holder.

Figure 2:
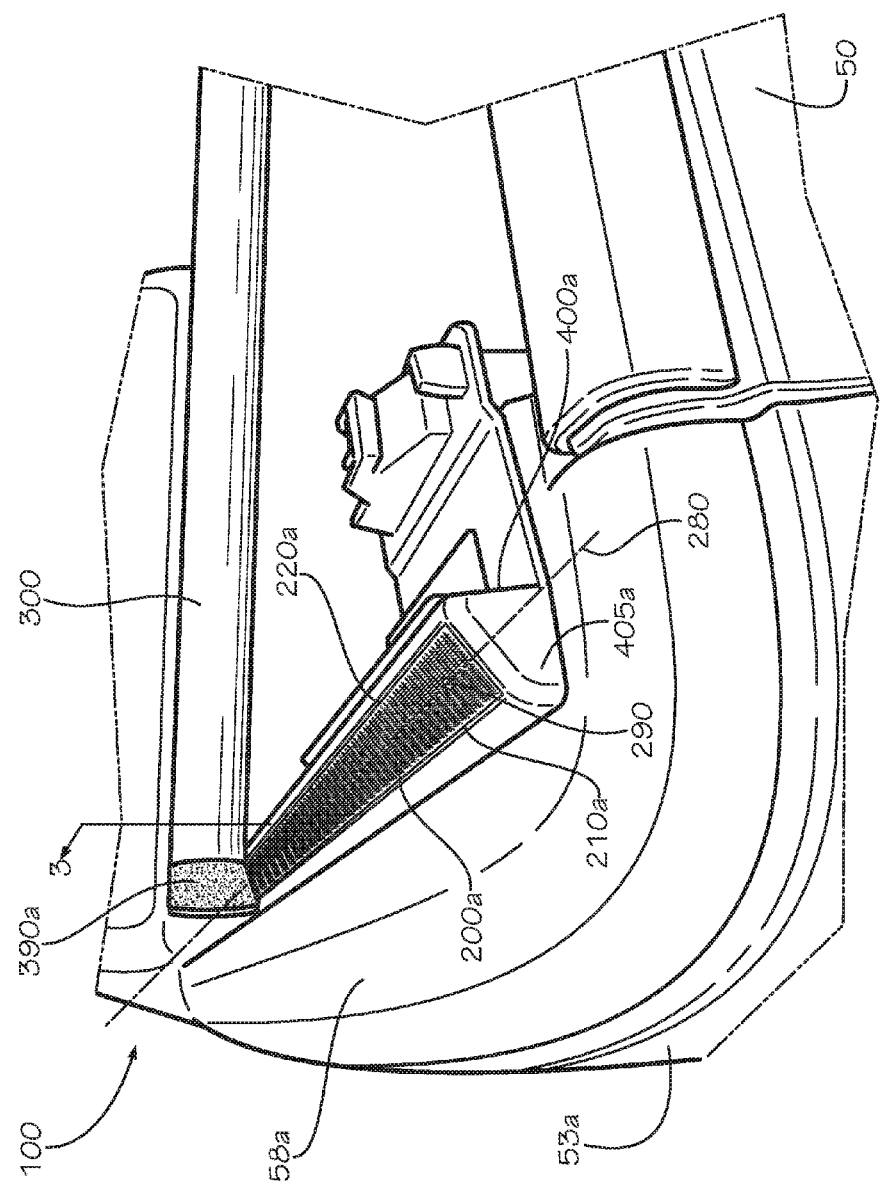
FIG. 2 is a perspective view of one side of the fastening system of FIG. 1.
Figure 3:
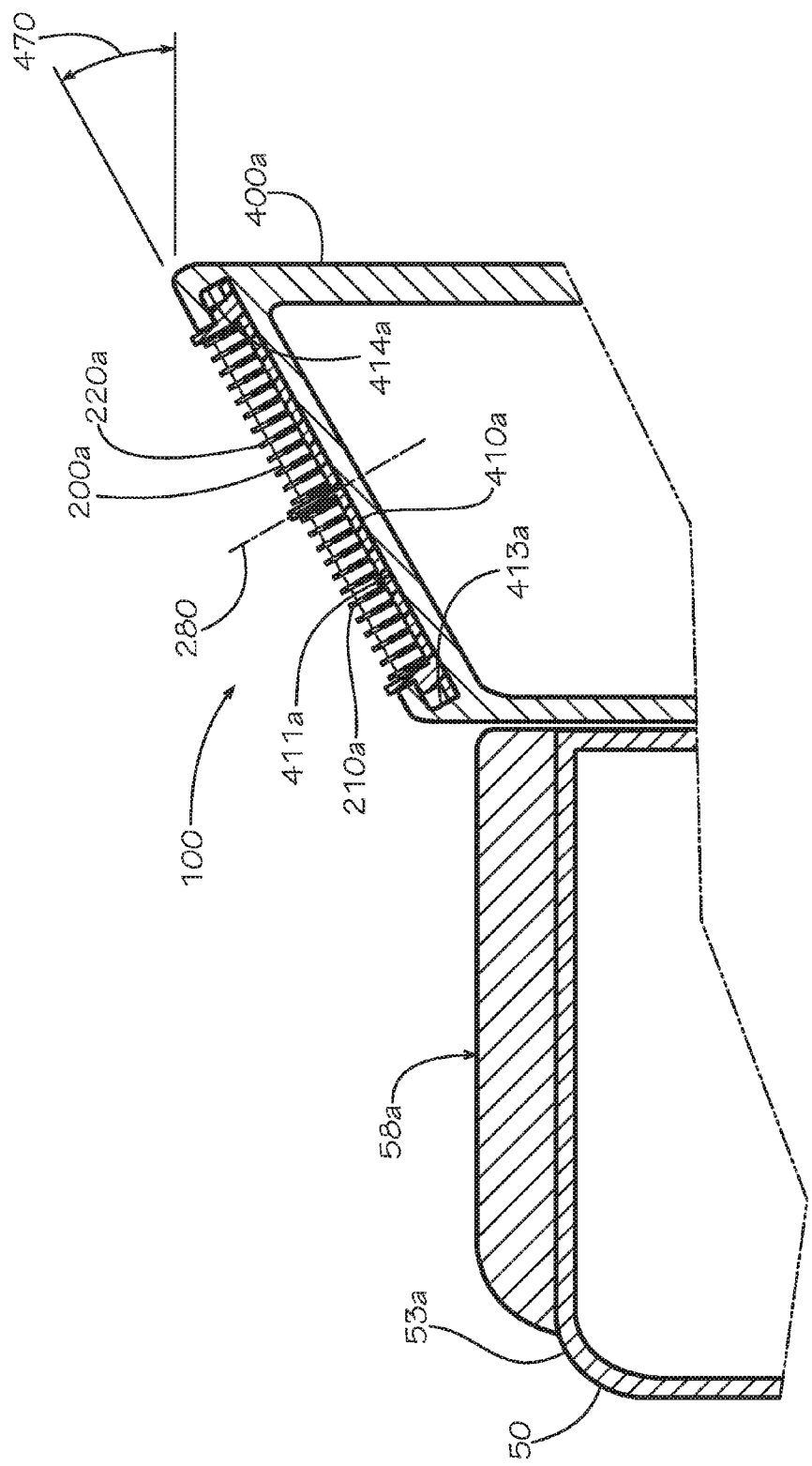
FIG. 3 is a sectional view of the fastening system of FIG. 1 taken from line 3 of FIG. 2.

FIGS. 1-3 disclose a fastening system 100 installed on a vehicle 50. The fastening system 100 can comprise a fastening device 200a,b. As shown, the fastening system 100 can comprise a pair of fastening devices 200a,b. The fastening system 100 can further comprise a panel 300, which can be, for example and without limitation, a cover or a pad. The panel 300 shown in FIG. 1 is a tonneau cover for a bed of the vehicle 50, which is a pickup truck. The fastening system 100 can further comprise a fastening device holder 400a,b comprising a first end 405a,b and a second end 406a,b, respectively. The vehicle 50 can comprise a left side wall 53a and a right side wall 53b, each of the left side wall 53a and the right side wall 53b comprising a cap 58a,b, respectively. In one aspect, each of the caps 58a,b is respectively received atop the left side wall 53a and the right side wall 53b. In another aspect, no cap is required on either of the side walls 53a,b.

The panel 300 can comprise an outer surface 301, an inner surface 302, a first side end 303, a second side end 304, a first lengthwise end 305 (shown in FIG. 13B), a second lengthwise end 306, and a central portion 310. The panel 300 can comprise a mating fastener material 390a,b. The mating fastener material 390a,b can be configured to secure the panel 300 to the fastening devices 200a,b. The panel can be made out of, for example and without limitation, a fabric, a polymer, a leather-type product, or a composite of several of these or any other materials and can be insulated or non-insulated, reinforced or non-reinforced, woven or non-woven.

Figure 5A:
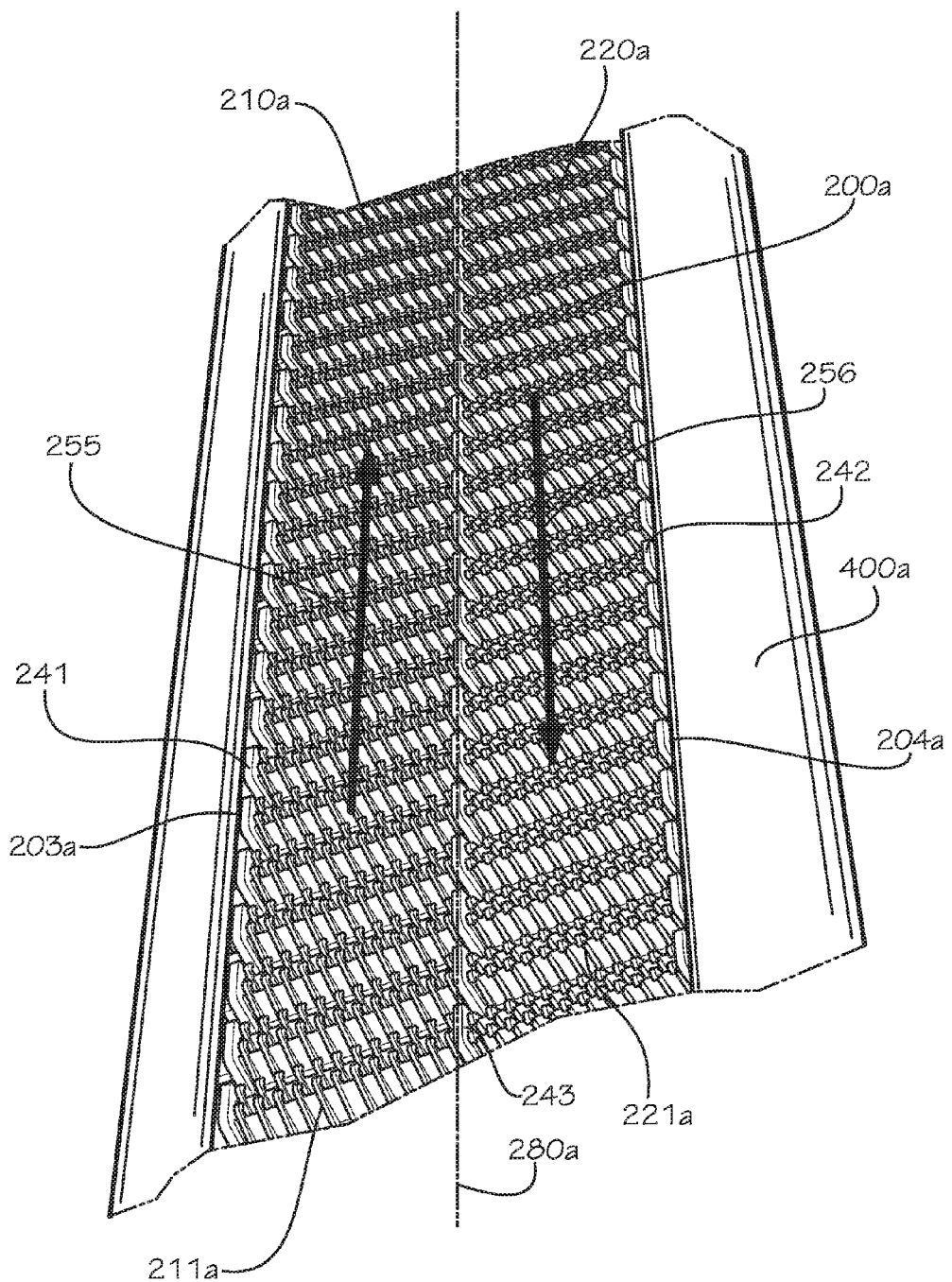
FIG. 5A is a top perspective view of the first fastening device of FIG. 1.
Figure 5B:
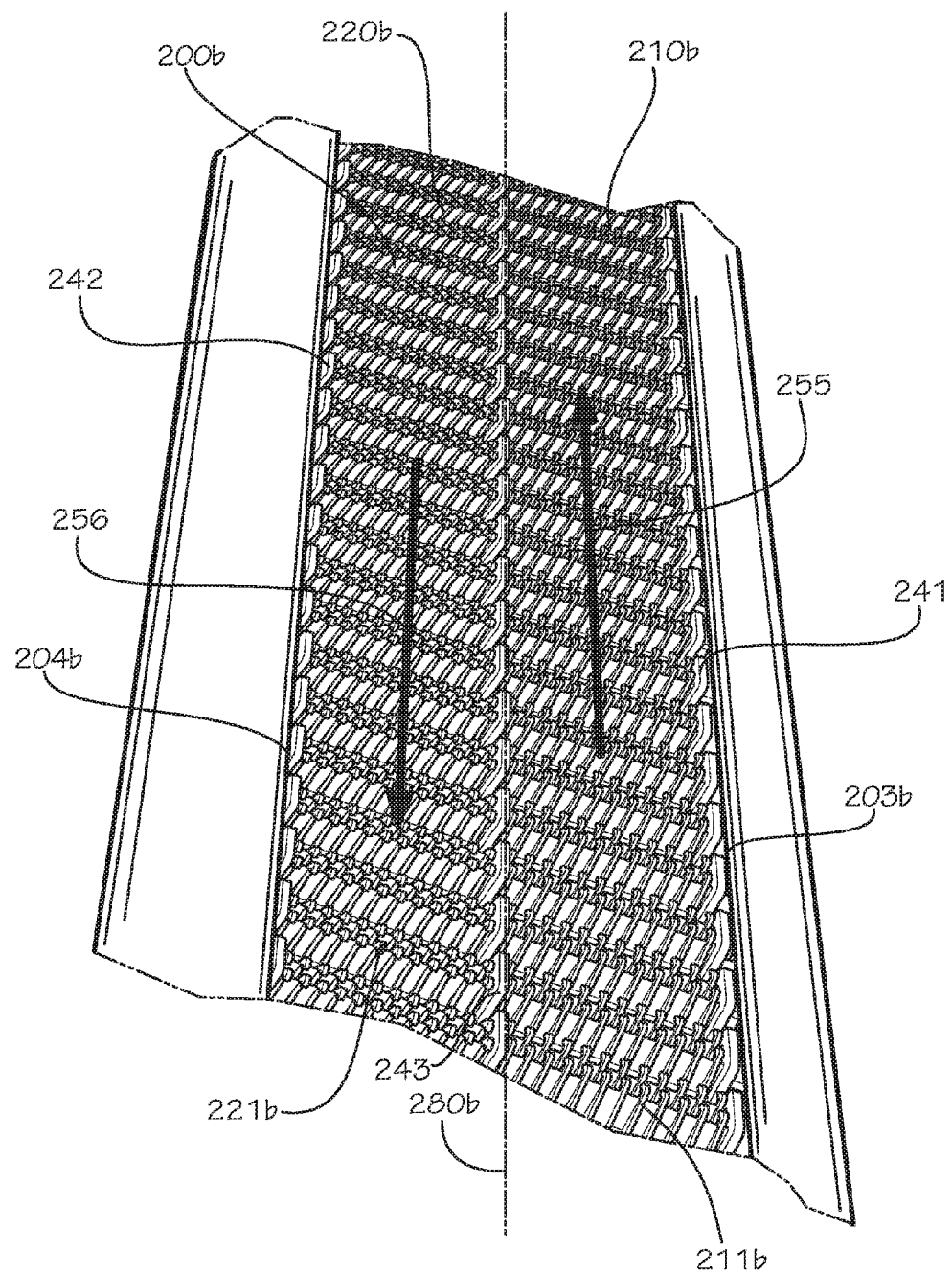
FIG. 5B is a top perspective view of a second fastening device of the fastening system of FIG. 1.

As shown in FIG. 2, each of the fastening device 200a,b (200b shown in FIG. 1) of the fastening system 100 can comprise a first fastening field 210a,b (210b shown in FIG. 5B) and a second fastening field 220a,b (220b shown in FIG. 5B). The second fastening field 220a can be divided from the first fastening field 210a by a dividing line 280. In one aspect, each of the fastening devices 200a,b can be secured to the fastening device holders 400a,b, respectively, with a fastener 290 proximate to the first ends 405a,b, respectively of the fastening device holder 400a,b. In another aspect, the fastening devices 200a,b can be secured to the fastening device holders 400a,b, respectively, with a plurality of fasteners 290 positioned proximate the first ends 405a,b, respectively, the second ends 406a,b, respectively, or between the first end 405a,b and the second end 406a,b, respectively. In yet another aspect, the fastening devices 200a,b can be secured to the fastening device holders 400a,b, respectively without any fasteners 290 or with only a single fastener 290 for each fastening device 200a,b.

As shown in FIG. 3, the fastening device holder 400a,b can define a channel 410a,b comprising side slots 413a,b and 414a,b, respectively. In one aspect, the channels 410a,b and the side slots 413a,b,414a,b of the fastening device holders 400a,b can be sized to receive the fastening device 200a,b, respectively. In one aspect, the channel 410a,b and the side slots 413a,b,414a,b can be sized to receive the fastening device 200a,b at the first end 405a,b or the second end 406a,b of the fastening device holder 400a,b. In another aspect, the channel 410a,b and the side slots 413a,b,414a,b can be sized to receive the fastening device 200a,b but the fastening device 200a,b can be installed at some point between the first end 405a,b and the second end 406a,b of the fastening device holder 400a,b. The channel 410a,b can further define a mounting surface 411a,b.

In one aspect, the fastening device holder 400a,b can be angled with respect to the central portion 310 of the panel 300 (shown in FIG. 1) by an angle 470 when the panel 300 is pulled taut or else angled with respect to the horizontal orientation by the angle 470. The angle 470 is thereby measured from the horizontal direction in the current aspect. In one aspect, for example and without limitation, the angle 470 can measure about 30 degrees. In another aspect, the angle 470 can measure less than or greater than about 30 degrees, including zero degrees, resulting in the fastening device holder 400a,b being oriented horizontally. In one aspect, the fastening device holder 400a,b can be oriented as shown and the central portion 310 of the panel 300 can be oriented in a horizontal orientation when pulled taut. In one aspect, the fastening device holder 400a,b can be oriented in an orientation 90 degrees from that shown and the central portion 310 of the panel 300 can be oriented in a vertical orientation when pulled taut. In another aspect, the central portion 310 of the panel 300 can be oriented in a neither a horizontal orientation nor a vertical orientation but can be angled with respect to both the horizontal orientation and the vertical orientation depending on the type and purpose of the panel 300. In yet another aspect, the panel 300 can define a more complex shape that varies in orientation from the first side end 303 to the second side end 304 or from the first lengthwise end 305 to the second lengthwise end 306—as may be desired when the panel 300 functions as a cover to cover a complex shape that is not flat in every orientation.

Figure 4:
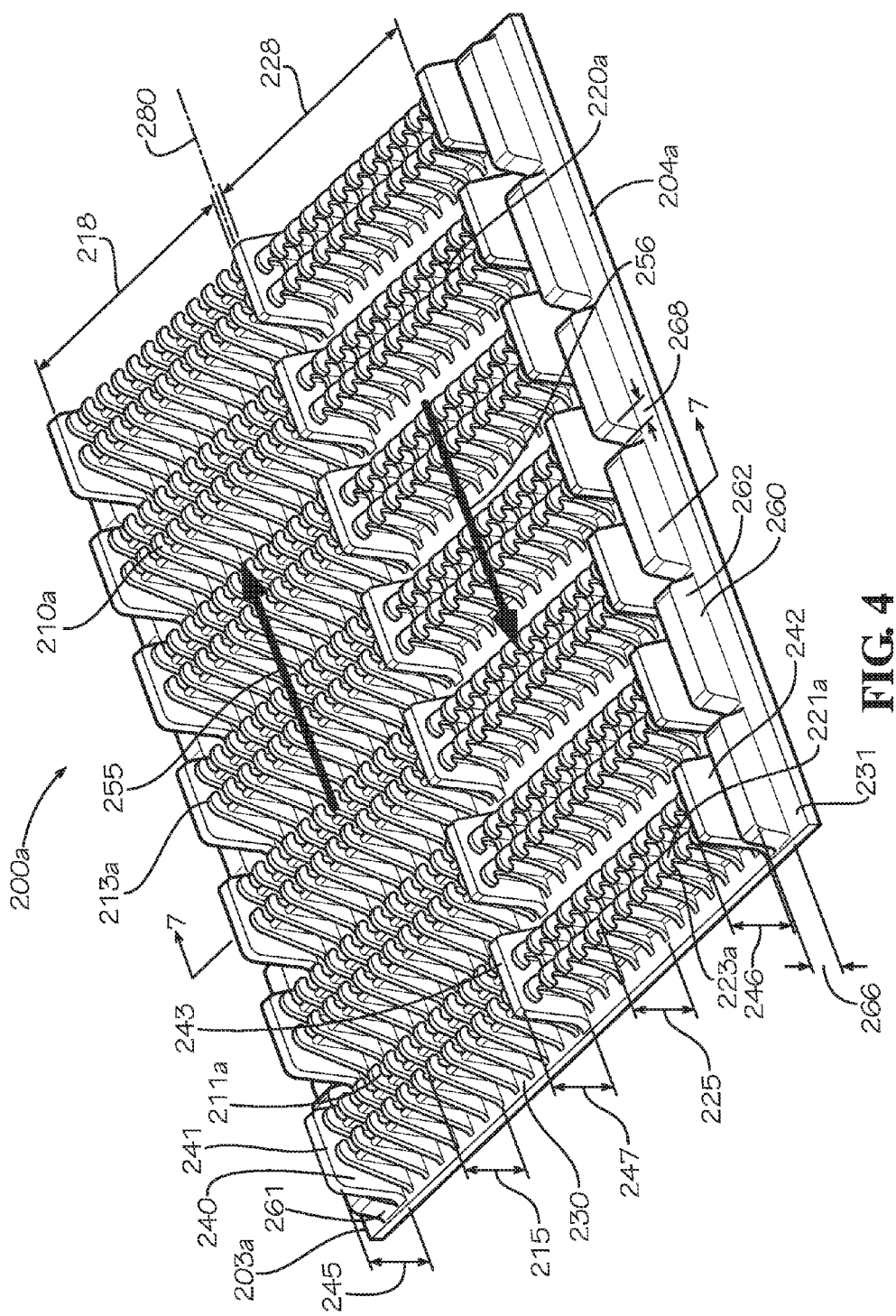
FIG. 4 is a perspective view of a portion of a first fastening device of the fastening system of FIG. 1.

In one aspect, as shown exemplarily in FIG. 4 with respect to fastening device 200a, each of the fastening devices 200a,b can comprise a first side end 203a,b and a second side end 204a,b, respectively. Each of the fastening devices 200a,b can further comprise a base 230 comprising a top surface 231 and a bottom surface 232 (shown in FIG. 6). The first fastening field 210a,b can extend from the top surface 231 of the base 230 and can comprise a plurality of first fastening elements 211a,b. Each of the first fastening elements 211a,b can comprise a fastening feature 213a,b, respectively (213b not shown). The fastening feature 213a,b can be a hook that is configured to removably fasten to the mating fastening material 390a,b, respectively (shown in FIG. 1). The basic shape of the hook can, in various aspects, match that of the PowerRail® product produced by YKK (U.S.A.) Inc. of Marietta, Ga. In one aspect, the fastening feature 213a,b of at least some of the first fastening elements 211a,b, respectively, can extend or face in a first direction 255. In another aspect, the fastening features 213a,b of all of the first fastening elements 211a,b, respectively, can extend in the first direction 255. In yet another aspect, the fastening feature 213a,b of at least some of the first fastening elements 211a,b, respectively, can extend in a direction that is angled with respect to the first direction 255. For example and without limitation, the fastening feature 213a,b of at least some of the first fastening elements 211a,b, respectively, can extend in a direction that is angled 90 degrees with respect to the first direction 255.

The second fastening field 220a,b can extend from the top surface 231 of the base 230 and can comprise a plurality of second fastening elements 221a,b. Each of the second fastening elements 221a,b can comprise a fastening feature 223a,b, respectively. The fastening feature 223a,b can be a hook that is configured to removably fasten to the mating fastening material 300a,b, respectively. In one aspect, as shown in FIG. 4, the fastening feature 223a,b of all of the second fastening elements 221a,b, respectively, can extend in a second direction 256 that is angled at an angle that is opposite from the first direction 255. In yet another aspect, the fastening feature 223a,b of at least some of the second fastening elements 221a,b, respectively, can extend in a direction that is angled with respect to the first direction 255 and the second direction 256. For example and without limitation, the fastening feature 223a,b of at least some of the second fastening elements 221a,b, respectively, can extend in a direction that is angled 90 degrees with respect to the second direction 256. Any one of the disclosed aspects can result in a "bi-directional" orientation of the fastening elements 211a,b,221a,b in which one portion of the fastening device—the first fastening field 210a,b—comprises fastening features 213a,b extending in one direction and another portion—the second fastening field 220*a,b*—extending in a different direction.

Extending in a particular direction such as the first direction 255 or the second direction 256 can mean that each of the fastening features 213*a,b*,223*a,b* is aligned with and extends from the fastening elements 211*a,b*,221*a,b*, respectively, in such direction. In one aspect, as shown, the fastening device 200*a,b* comprises only the first fastening field 210*a,b* and the second fastening field 220*a,b*, respectively. In another aspect, the fastening device 200*a,b* can comprise a third fastening field, a fourth fastening field, or more than four fastening fields, each fastening field comprising fastening elements, the fastening feature of each of the fastening elements of each fastening field extending in a single direction.

The fastening device 200*a,b* can further comprise a wall 240 or a plurality of walls 240, each wall 240 extending from the top surface 231 of the base 230. In one aspect, a first wall 241 can extend from the top surface 231 of the base 230 and define a wall height 245 that is greater than a fastener height 215 of each of the first fastening elements 211*a,b* and greater than a fastener height 225 of each of the second fastening elements 221*a,b*. In another aspect, a second wall 242 can extend from the top surface 231 of the base 230 and define a wall height 246 that is greater than the fastener height 215 of each of the first fastening elements 211*a,b* and greater than the fastener height 225 of each of the second fastening elements 221*a,b*. In yet another aspect, a third wall 243 can extend from the top surface 231 of the base 230 and define a wall height 247 that is greater than the fastener height 215 of each of the first fastening elements 211*a,b* and greater than the fastener height 225 of each of the second fastening elements 221*a,b*.

In one aspect, the plurality of walls 240 can be distributed along a longitudinal direction that is parallel to the dividing line 280 of the fastening device 200*a,b*. As shown in FIG. 4, the first wall 241 can be positioned between the first side end 203*a,b* of the fastening device 200*a,b* and the first fastening field 210*a,b* and a second wall 242 can be positioned between the second side end 204*a,b* distal from the first side end 203*a,b* and the second fastening field 220*a,b*. In yet another aspect, the third wall 243 can be positioned between the first wall 241 and the second wall 242, between the first fastening field 210*a,b* and the second fastening field 220*a,b* and, as shown, optionally aligned with the dividing line 280.

The fastening device 200*a,b* can further comprise a plurality of guides 260, each of which can be sized to be received within the side slots 413,414 (shown in FIG. 3) of the channel 410 of the fastener device holder 400*a,b*. For example and without limitation, a first guide 261 can have a guide height 265 (shown in FIG. 6) that is less than or equal to a height of the side slot 413*a,b*, and a second guide 262 can have a guide height 266 that is less than or equal to a height of the side slot 414*a,b*. Each of the guides 260—including the first guide 261 and the second guide 262—can be rounded at one or both ends proximate to the first lengthwise end 205*a,b* and the second end 206*a,b*, respectively, of the fastening device 200*a,b*, in order to facilitate installation of the fastening device 200*a,b* into the fastening device holder 400*a,b*.

In one aspect, as shown, the plurality of guides 260 of the fastening device 200*a,b* can be distributed in a longitudinal direction such that a plurality of gaps 268 separate each of the guides 260 aligned in the longitudinal direction. The gaps 268 can facilitate the bending of long lengths of the fastening device 200*a,b* such as during the manufacturing, storing, or shipping of the fastening device 200*a,b*. The gaps 268 can also facilitate the use of the fastening device 200*a,b* in a fastening device holder 400*a,b* that is not straight but rather curved. In another aspect, the plurality of guides 260 can be distributed in a longitudinal direction without gaps 268 separating each of the guides 260 aligned in the longitudinal direction such that each guide 260 contacts a longitudinally adjacent guide 260.

The first fastening field 210*a,b* of the respective fastening devices 200*a,b* can define a width 218, and the second fastening field 220*a,b* of the fastening device 200*a,b* can define a width 228. In one aspect, the width 218 of the base 230 from which the respective first fastening field 210*a,b* extends and the width 228 of the base 230 from which the respective second fastening field 220*a,b* extends are substantially equal although they need not be. In another aspect, a surface area (not shown) of the base 230 from which the first fastening field 210*a,b* extends and a surface area (not shown) of the base 230 from which the second fastening field 220*a,b* extends are substantially equal although they need not be.

As shown in FIGS. 5A and 5B, for reasons that will be explained hereafter, the fastening device 200*b* can be a mirror image of the fastening device 200*a*. As shown, the fastening feature 213*a,b* of each of the first fastening elements 211*a,b* of the first fastening fields 210*a,b*, respectively, can extend in the first direction 255, and the fastening feature 223 of each of the second fastening elements 221*a,b* of the second fastening field 220*a,b* can extend in the second direction 256. In one aspect, the direction of the fastening features and the proper orientation of the fastening devices 200*a,b* will be evident to the user. In another aspect, the fastening device 200*a,b* can comprise a symbol or text or be otherwise shaped or marked to denote a particular use and orientation such as left or right, top or bottom, or inside or outside. Such shaping or marking can be incorporated during or after molding of the fastening device 200*a,b*.

Figure 6:
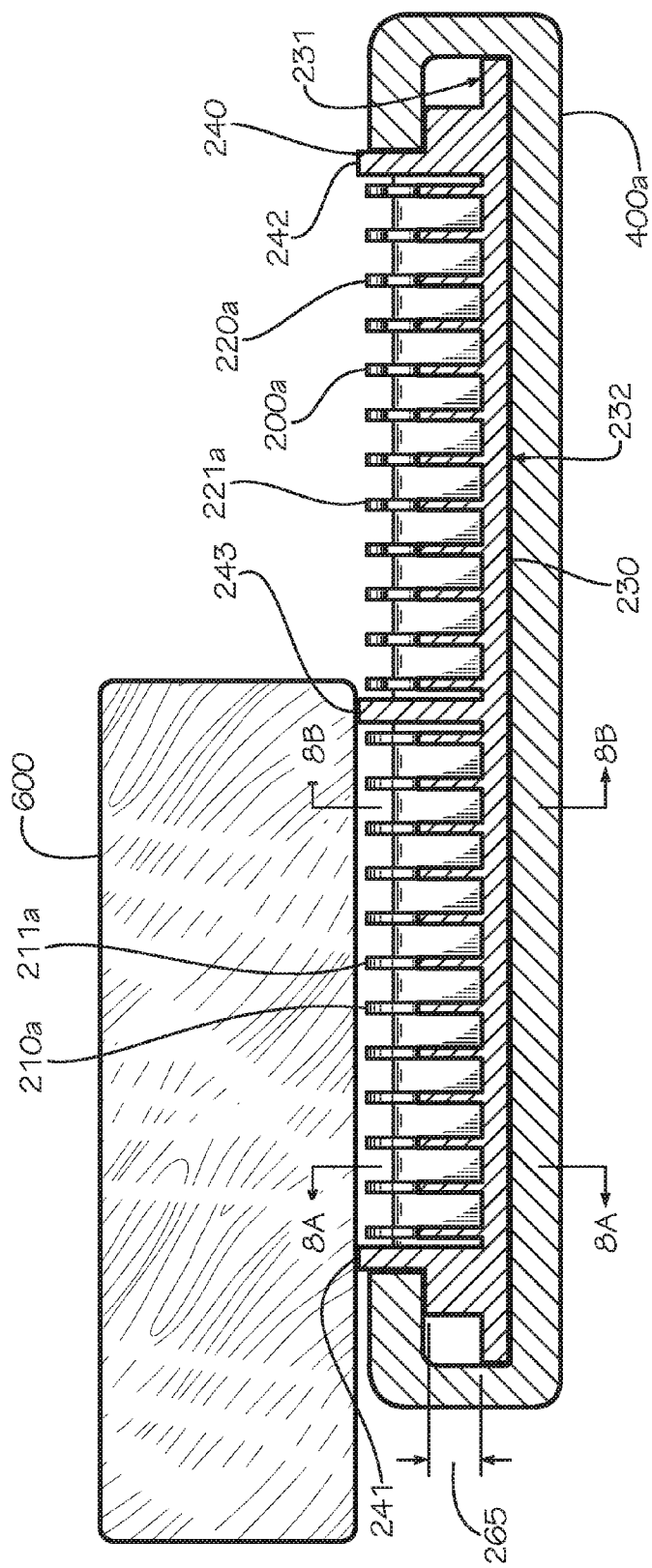
FIG. 6 is a sectional view of the fastening system of FIG. 1 together with an object contacting the first fastening device taken in the direction of line 7-7 of FIG. 4.

As exemplarily shown in FIG. 6 with respect to the fastening device 200*a*, the presence of the walls 240—and specifically the first wall 241, the second wall 242, and the third wall 243—can protect the first fastening elements 211*a,b* of the first fastening field 210*a,b* and the second fastening elements 221*a,b* of the second fastening field 220*a,b* from impact by objects such as a board 600 that is laid on top of or made to impact the fastening device 200*a*. The presence of the walls 240 can also protect portions of the fastening device 200*a,b* during manufacture and assembly of the fastening system 100 by allowing the use of automated equipment that contacts the walls 240 but not the typically more load-sensitive fastening elements 211*a,b*, 221*a,b*. Because the wall heights 245,246,247 of the walls 241,242,243, respectively, are higher than the fastener heights 215,225 of the first fastening elements 211*a,b* and the second fastening elements 221*a,b*, the board 600 cannot as easily contact and thereby damage the first fastening elements 211*a,b* and the second fastening elements 221*a,b*.

Figure 7D:
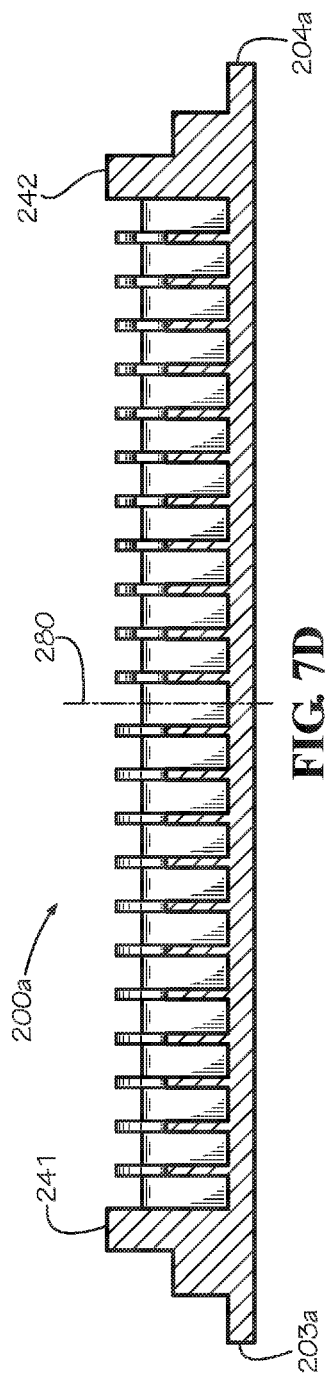
FIG. 7D is a sectional view of the first fastening device of FIG. 4 in accordance with another aspect of the current disclosure.
Figure 7E:
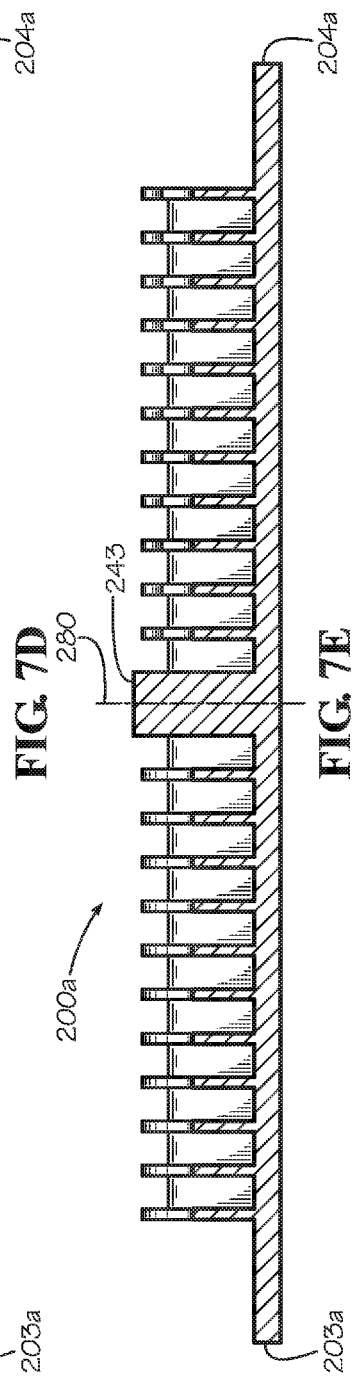
FIG. 7E is a sectional view of the first fastening device of FIG. 4 in accordance with another aspect of the current disclosure.
Figure 7F:
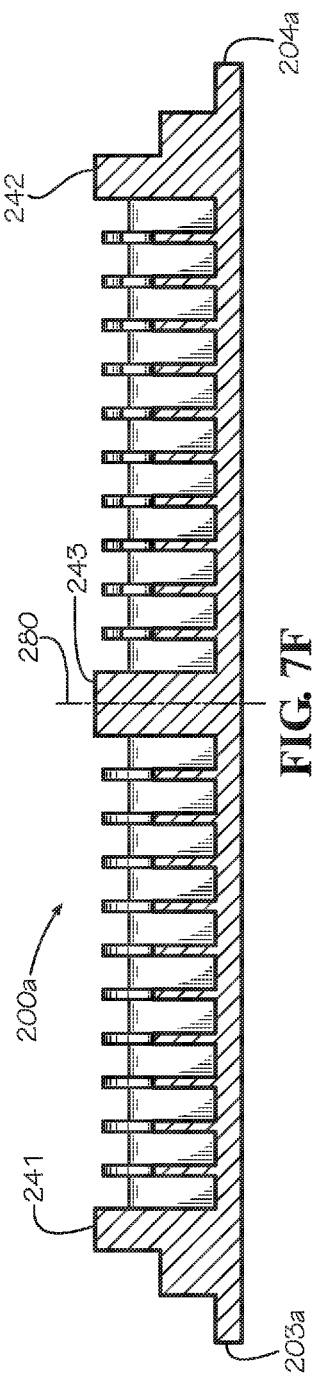
FIG. 7F is a sectional view of the first fastening device of FIG. 4 in accordance with another aspect of the current disclosure.

FIGS. 7A-7F disclose various aspects of the fastening device 200*a* comprising various combinations of the first wall 241, the second wall 242, and the third wall 243. As shown in FIG. 7A, the fastening device 200*a* can comprise the first wall 241 positioned proximate to the first side end 203*a* and the second wall 242 positioned proximate to the second side end 204*a*. As shown in FIG. 7B, the fastening device 200*a* can comprise the third wall 243 positioned between the first fastening field 210*a* and the second fastening field 220*a* and proximate to and aligned with the dividing line 280, shown as a plane in FIGS. 7A-7F. As shown in FIG. 7C, the fastening device 200*a* can comprise the first wall 241 positioned proximate to the first side end 203a, the second wall 242 positioned proximate to the second side end 204a, and the third wall 243 positioned between the first fastening field 210a and the second fastening field 220a—as well as between the first walls 241 and the second walls 242—and proximate to and aligned with the dividing line 280. As shown in FIG. 7D, the fastening device 200a can comprise a wider first wall 241 (or a pair of adjacent instances of the first wall 241) positioned proximate to the first side end 203a and a wider second wall 242 (or a pair of adjacent instances of the second wall 242) positioned proximate to the second side end 204a. As shown in FIG. 7E, the fastening device 200a can comprise a wider third wall 243 (or a pair of adjacent instances of the third wall 243) positioned between the first fastening field 210a and the second fastening field 220a and proximate to and aligned with the dividing line 280. As shown in FIG. 7F, the fastening device 200a can comprise a wider first wall 241 (or a pair of adjacent instances of the first wall 241) positioned proximate to the first side end 203a, a wider second wall 242 (or a pair of adjacent instances of the second wall 242 positioned proximate to the second side end 204a), and a wider third wall 243 (or a pair of adjacent instances of the third wall 243) positioned between the first fastening field 210a and the second fastening field 220a—as well as between the first walls 241 and the second walls 242—and proximate to the dividing line 280.

For the fastening device 200a shown in FIGS. 7D-7F, each of the adjacent instances (not shown) of the first wall 241, the second wall 242, and the third wall 243 can be made to alternate in position in a longitudinal direction such that a first instance of each of the first wall 241, the second wall 242, and the third wall 243 is offset from a second instance of each of the first wall 241, the second wall 242, and the third wall 243 just as some of the guides 262 are offset in a longitudinal direction from at least some of the second walls 242 in FIG. 4.

Figure 8A:
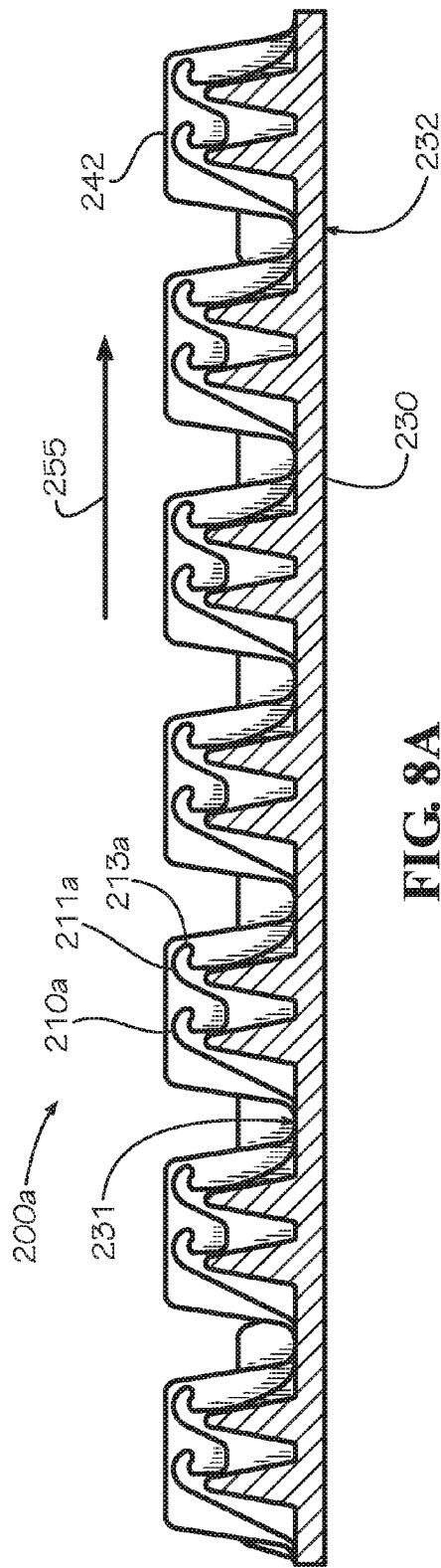
FIG. 8A is a sectional view of the first fastening device of FIG. 4 taken along line 8A-8A of FIG. 6.
Figure 8B:
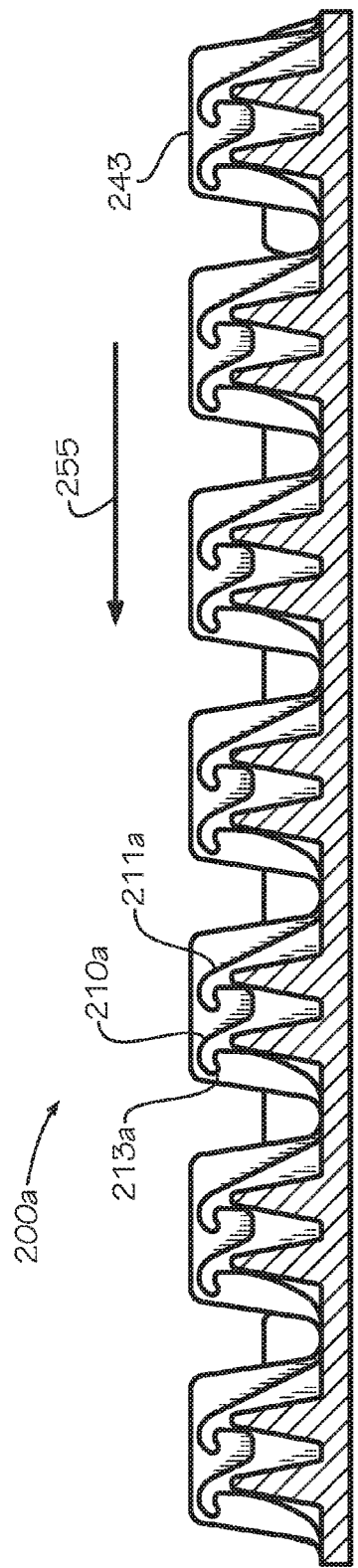
FIG. 8B is a sectional view of the first fastening device of FIG. 4 taken along line 8B-8B of FIG. 6.
Figure 12:
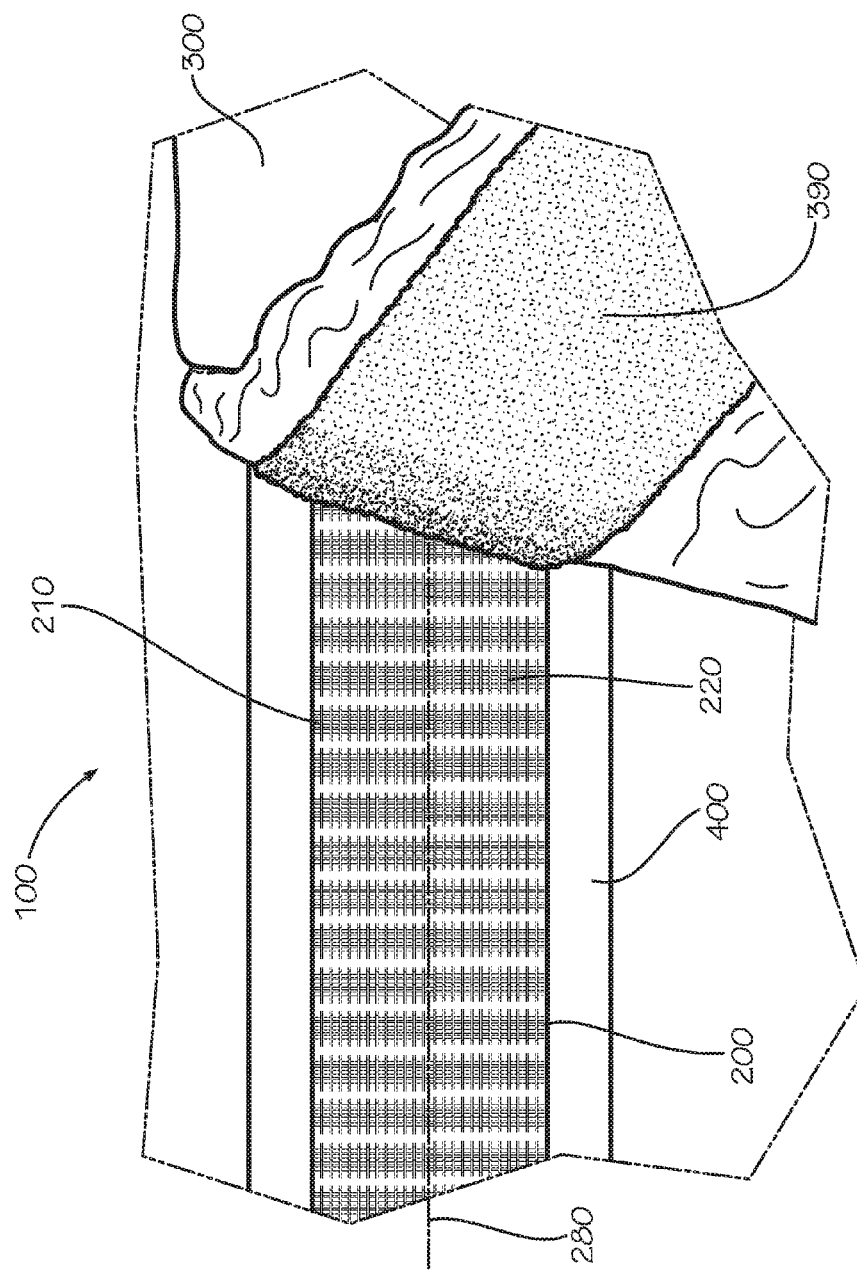
FIG. 12 is a perspective view of a fastening system in accordance with another aspect of the current disclosure.

FIGS. 8A and 8B disclose sectional views of the fastening device 200a in which the geometry of the fastening elements 211a,b,221a,b (221a shown in FIG. 5A, 211b and 221b shown in FIG. 5B) and the fastening features 213a,b,223a,b (223a shown in FIGS. 4, 213b and 223b not shown) thereof is clearly visible. The fastening elements 211a,b,221a,b can comprise a pair of fastening features 213a,b,223a,b, each of which can be a hook head, which can extend in the first direction 255 and the second direction 256, respectively. As previously stated, extending in a particular direction such as the first direction 255 or the second direction 256 can mean that each of the fastening features 213a,b,223a,b is aligned with and extends from the fastening elements 211a,b,221a,b, respectively, in such direction. More specifically, extending in a particular direction such as the first direction 255 or the second direction 256 can mean that a portion of each of the fastening features 213a,b,223a,b extends in a horizontal direction from a portion of the corresponding fastening element 211a,b,221a,b. Any shape of the fastening features 213a,b,223a,b that can provide a "hook" for the mating fastener material 390a,b to fasten can suffice to secure the mating fastening material 390a,b when the fastening device 200a,b is brought into contact with the mating fastening material 390a,b, respectively. In one aspect, each of the fastening features 213a,b,223a,b when viewed from the side as shown can extend horizontally from a vertical portion of the fastening elements 211a,b,221a,b. In another aspect, each of the fastening features 213a,b,223a,b can extend in a direction that is angled up or down with respect to the base 230. In one aspect, each of the fastening features 213a,b, 223a,b when viewed from above (such as shown in FIG. 12) can be aligned with the first direction 255 or the second direction 256. In another aspect, each of the fastening features 213a,b,223a,b when viewed from above can be angled with respect to the first direction 255 or the second direction 256.

Figure 9:
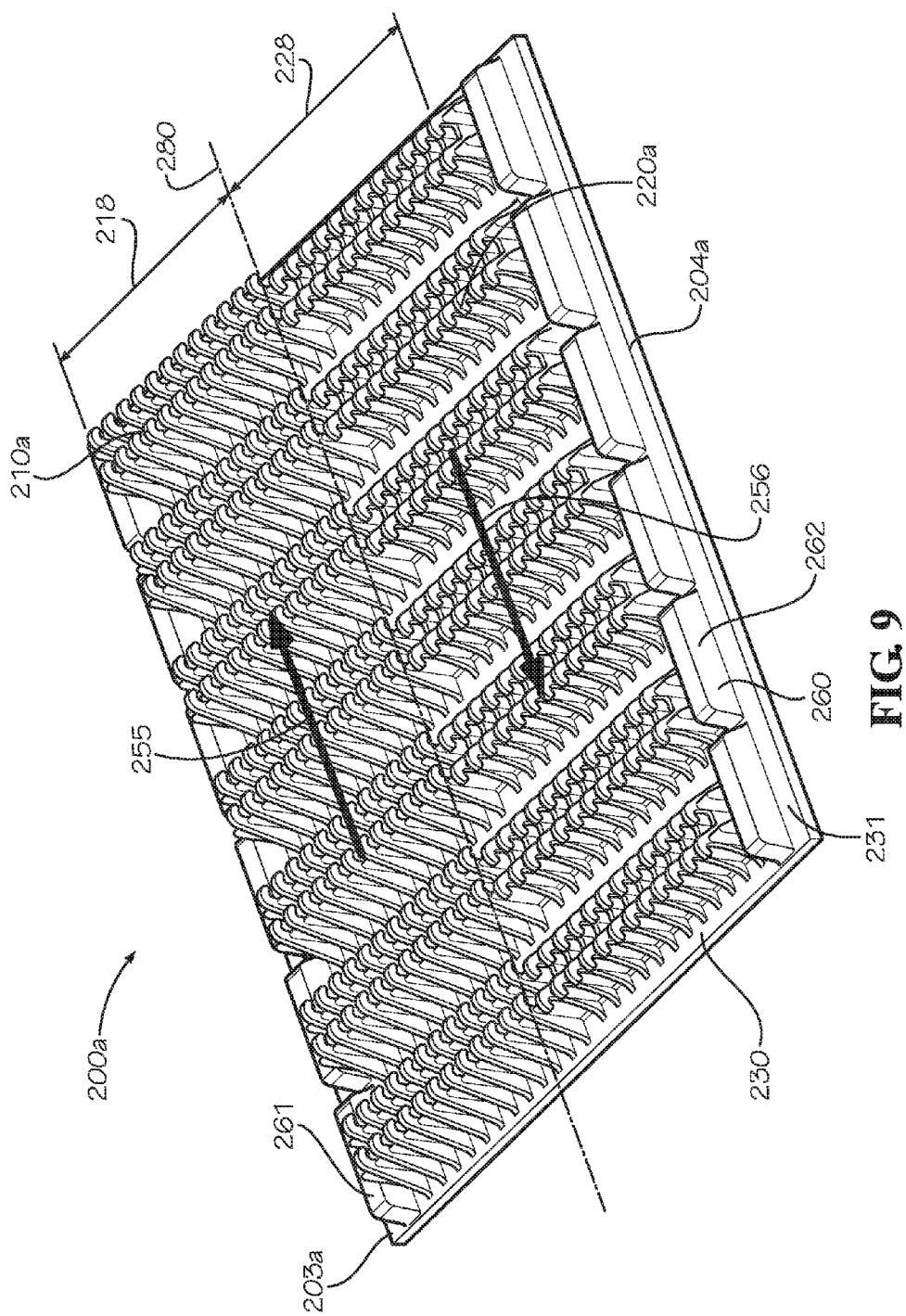
FIG. 9 is a perspective view of a truncated portion of a first fastening device of the fastening system of FIG. 1 in accordance with another aspect of the current disclosure.

In another aspect, as shown exemplarily in FIG. 9 with respect to the fastening device 200a, the fastening device 200a can comprise the first side end 203a and the second side end 204a. However, the walls 240 can be omitted from the fastening device 200a. In particular, the first wall 241, the second wall 242, and the third wall 243 can be omitted. The fastening device 200a can otherwise comprise the features described as being part of the fastening device 200a shown in FIG. 4.

As shown in FIGS. 10-11, each of the first fastening elements 211a,b can extend in a row 1010 arranged in a transverse direction 257 across the first fastening field 210a,b, respectively—and similarly, each of the second fastening elements 221a,b can extend in a row (not shown) arranged in a transverse direction 257 across the second fastening field 220a,b, respectively. In one aspect, as shown in FIG. 10, each of the first fastening elements 211a,b in a row 1010—and each of the second fastening elements 221a,b in a row—can be joined by joining ribs 216,226 (226 not shown), respectively, defining a rib height 219, which can be less than the fastener height 215 of the first fastening elements 211a,b and the fastener height 225 of the second fastening elements 221a,b. Joining each of the first fastening elements 211a,b to each other in the row 1010 and similarly joining each of the second fastening elements 221a,b to each other in a row can result in a more rigid or stiff fastening device 200a,b that is less likely to bend in the transverse direction 257 such that the base 230 is not flat when viewed in a transverse cross section. Thus during, for example and without limitation, disengagement of the mating fastening material 390a,b from the fastening device 200a,b, the base 230 of the fastening device 200a,b can retain its flat shape and remain securely in the fastening device holder 400a,b. In addition, the base 230 can be made thinner than would otherwise be required due the presence of the joining ribs 216 connecting each of the fastening elements 211a,b,221a, b.

In another aspect, as shown in FIG. 11, each of the joining ribs 216 can be made to extend from each side of each of the first fastening elements 211a,b but not extend to the first fastening element 211a,b or the joining rib 216 that is positioned adjacent to it. Likewise, each of the joining ribs 226 can be made to extend from each side of each of the second fastening elements 221a,b but not extend to the second fastening element 221a,b or the joining rib 226 that is positioned adjacent to it. Further, in the gap defined between adjacent joining ribs 216,226, the fastener device 200a can comprise a second joining rib 217 defining a rib height that is less than the rib height 219 of the joining ribs 216,226.

The fastening device 200a,b can be formed from any one of a variety of polymer or other materials including, for example and without limitation, polybutylene terephthalate (PBT), NYLON or similar polyamides, or polypropylene (PP).

FIG. 12 discloses the fastening system 100 as mounted in a vertical orientation. As shown, the fastener system 100 can comprise the fastening device 200 mounted in the fastening device holder 400. The fastening system 100 can further comprise the panel 300, which can be a gym mat or a wall covering, comprising the mating fastener material 390. As shown, the fastener device holder 400 can be mounted on a vertical wall surface or any other vertical surface and can fastenably receive the panel 300.

FIGS. 13A-13B and 14A-14B disclose a method of using the fastening system 100. As shown in FIG. 1-3, a method of using a fastening system 100 can comprise securing each of a pair of the fastening devices 200a,b to the mounting surface 411a,b of the respective fastening device holders 400a,b, for example and without limitation, by inserting the fastening devices 200a,b into the channels 410a,b, respectively, of the fastener device holders 400a,b. The fastening devices 200a,b can comprise the first fastening field 210a,b, respectively, comprising the plurality of first fastening elements 211a,b (shown in FIG. 4), each of which can comprise the fastening feature 213a,b, respectively (shown in FIG. 4). The fastening devices 200a,b can further comprise the second fastening field 220a,b, respectively comprising the plurality of second fastening elements 221a,b, respectively (shown in FIG. 4), each of which can comprise the fastening feature 223a,b, respectively (shown in FIG. 4), the second fastening field 220a,b divided from the first fastening field 210a,b by the dividing line 280.

Figure 13A:
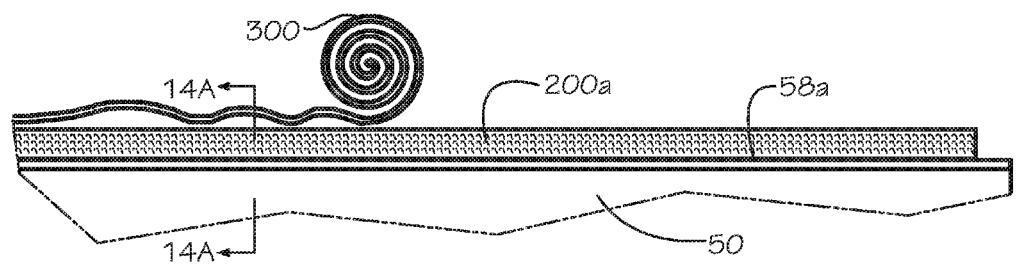
FIG. 13A is a side view of the fastening system of FIG. 1 before a cover of the fastening system is completely installed.
Figure 14A:
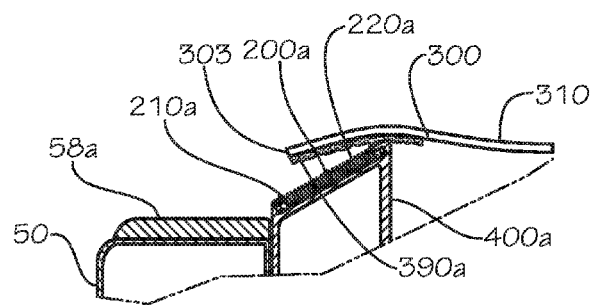
FIG. 14A is a sectional view of the fastening system of FIG. 1 taken from line 14A-14A of FIG. 13A.

As shown exemplarily in FIGS. 13A and 14A with respect to the fastening device 200a and associated surrounding components, the method can further comprise contacting the fastening devices 200a,b with the mating fastener material 390a,b of the panel 300. While the mating fastener material 390a,b can be configured to secure the panel 300 to both the first fastening field 210a and the second fastening field 220a, causing the mating fastener material 390a,b of the panel 300 to contact only the second fastener elements 221a,b of the second fastener field 220a,b, respectively, will allow sliding of the panel 300 with respect to the fastening devices 200a,b because the fastening features 223a,b are extending in the same direction 256 that the panel 300 is being slid. Thus each of the second fastening elements 221a,b is configured not to catch on the mating fastening material 390a,b, respectively, and as shown each of the first fastening elements 211a,b is configured by the existence of the angle 470 (shown in FIG. 3) not to contact the mating fastener material 390a,b, respectively. Even if the first side end 303 of the panel 300 extends slightly downward as shown, the angle 470 can be set to exceed an angle created by the first side end 303 relative to the horizontal orientation.

Figure 13B:
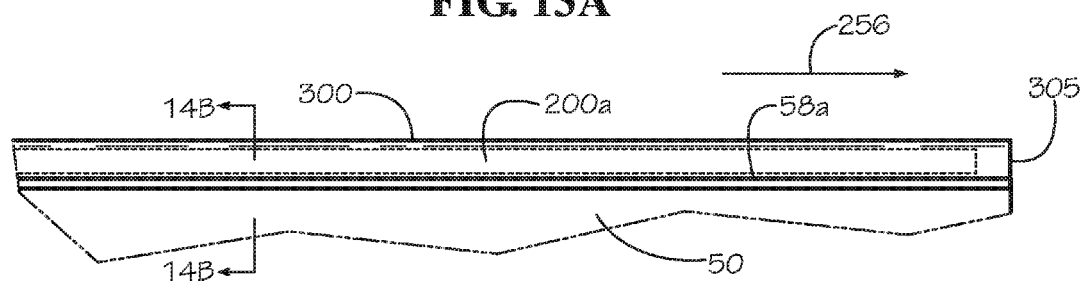
FIG. 13B is a side view of the fastening system of FIG. 1 after the panel of the fastening system is completely installed.
Figure 14B:
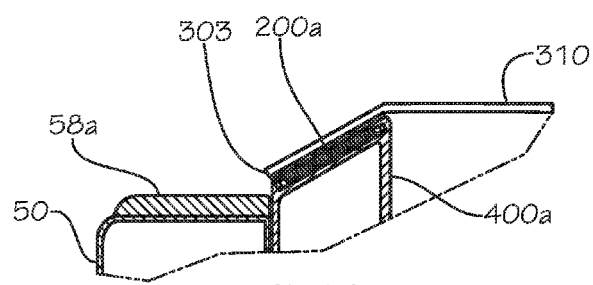
FIG. 14B is a sectional view of the fastening system of FIG. 1 taken from line 14B-14B of FIG. 13B.

The method can further comprise sliding the mating fastener material 390a,b with respect to the fastening device 200a,b, respectively. The fastening feature 223a,b of all of the second fastening elements 221a,b, respectively, can extend in a direction that is the same as the direction 256 of the sliding of the mating fastener material 390a,b with respect to the fastening device 200a,b, respectively. Contacting the fastening device 200a,b with the mating fastener material 390a,b, respectively, can comprise contacting only the second fastening field 220a,b of the fastening device 200a,b with the mating fastener material 390a,b. As shown in FIG. 14A, by orientating the second fastening field 220a,b proximate to a portion of the fastening device holder 400a,b that is closest to the panel 300 a user can avoid premature engagement of the mating fastener material 390a,b with the fastening devices 200a,b, respectively. The method can further comprise contacting both the first fastening field 210a,b of the fastening device 200a,b and the second fastening field 220a,b of the fastening device 200a,b with the mating fastener material 390a,b, respectively. Contacting both the first fastening field 210a,b of the fastening device 200a,b and the second fastening field 220a,b of the fastening device 200a,b with the mating fastener material 390a,b, respectively, can be made to occur after sliding the mating fastener material 390a,b with respect to the fastening device 200a,b by pulling the panel 300 taut as shown in FIGS. 13B and 14B.

When using the fastening system 100 to secure a tonneau cover or any panel 300 that experiences shear loads between the panel 300 and the fastening devices 200a,b, the strength of engagement can be important. The disclosed fastening device 200a,b has been shown, even after 5,000 cycles, to withstand cross-shear loads greater than brand-new products that are currently available from others.

In addition to using the panel 300 as a tonneau cover to cover a truck bed as shown, such a panel 300 can, for example and without limitation, also be used as a tonneau cover to cover a stored convertible top assembly on a vehicle with a lowerable or removable top, as a cover on a vehicle having an open top (such as a JEEP type vehicle), as a dodger, spray hood, or bimini on a boat such as a sailboat to cover a portion of the cockpit, as a gym mat for storage on a wall, as a headliner, as a cushions, as a curtain, or as an vertical pad within an elevator.

Various methods for manufacturing the fastening device 200 (including either of the fastening devices 200a,b) include those shown in U.S. Pat. No. 6,896,759 to Fujisawa, et al., which is hereby incorporated by reference in its entirety. In the processes disclosed therein, the fastening device 200a,b can be quickly cooled after molding the fastening elements 211a,b,221a,b but before removing the fastening elements 211a,b,221a,b from the dies so as to avoid deformation of the fastening elements 211a,b,221a,b while the material used to form the fastening device 200a,b is still warm.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A fastening device comprising:
   a base comprising a top surface;
   a first fastening field extending from the top surface of the base and comprising a plurality of first fastening elements, each of the first fastening elements comprising a fastening feature, the fastening feature of at least some of the first fastening elements extending in a first direction;
   a second fastening field extending from the top surface of the base and comprising a plurality of second fastening elements, each of the second fastening elements comprising a fastening feature, the fastening features of all of the second fastening elements extending in a second direction that is angled with respect to the first direction, the second fastening field divided from the first fastening field by a dividing line; and
   a wall extending from the top surface of the base and defining a wall height that is greater than a fastener height of each of the first fastening elements and greater than a fastener height of each of the second fastening elements, wherein the wall is positioned between a side end of the fastening device and a one of the first fastening field and the second fastening field.

2. The fastening device of claim 1, wherein a width of the first fastening field and a width of the second fastening field are substantially equal.

3. The fastening device of claim 1, wherein the fastening feature of each of the first fastening elements and the fastening feature of each of the second fastening elements are hooks.

4. The fastening device of claim 1, wherein each of the first fastening elements extends in a row arranged in a transverse direction across the first fastening field and each of the second fastening elements extends in a row arranged in a transverse direction across the second fastening field, each of the first fastening elements in a row and each of the second fastening elements in a row joined by a joining rib defining a rib height equal to at least half of a fastener height of the first fastening elements and the second fastening elements.

5. The fastening device of claim 1, wherein the fastening features of all of the first fastening elements extend in the first direction.

6. The fastening device of claim 1, wherein the second direction is opposite from the first direction.

7. A fastening system comprising:
   a fastening device comprising:
      a base comprising a top surface;
      a first fastening field extending from the top surface of the base and comprising a plurality of first fastening elements, each of the first fastening elements comprising a fastening feature, the fastening feature of at least some of the first fastening elements extending in a first direction;
      a second fastening field extending from the top surface of the base and comprising a plurality of second fastening elements, each of the second fastening elements comprising a fastening feature, the fastening feature of all of the second fastening elements extending in a second direction that is angled with respect to the first direction, the second fastening field divided from the first fastening field by a dividing line; and
      a wall extending from the top surface of the base and defining a wall height that is greater than a fastener height of each of the first fastening elements and greater than a fastener height of each of the second fastening elements; and
   a panel comprising an inner surface comprising a mating fastener material, the mating fastener material configured to secure the panel to the first fastening field and the second fastening field.

8. The fastening system of claim 7, further comprising a fastening device holder defining a channel sized to receive the fastening device at one end of the fastening device holder.

9. The fastening system of claim 8, wherein the fastening device holder is angled with respect to a central portion of the panel when the panel is pulled taut over the fastening device.

10. The fastening system of claim 7, further comprising a plurality of walls, each wall extending from the top surface of the base and defining a wall height that is greater than a fastener height of each of the first fastening elements and greater than a fastener height of each of the second fastening elements, the plurality of walls distributed between a first end of the fastening device and a second end of the fastening device.

11. The fastening system of claim 7, further comprising a pair of walls, each wall extending from the top surface of the base and defining a wall height that is greater than a fastener height of each of the first fastening elements and greater than a fastener height of each of the second fastening elements, a first wall of the pair of walls positioned between a first side end of the fastening device and the first fastening field and a second wall of the pair of walls positioned between a second side end distal from the first side end and the second fastening field.

12. The fastening system of claim 11, further comprising a third wall extending from the top surface of the base and defining a wall height that is greater than a fastener height of each of the first fastening elements and greater than a fastener height of each of the second fastening elements, the third wall positioned between the first wall and the second wall.

\* \* \* \* \*